United States Patent [19]

Panayappan et al.

[11] Patent Number: 4,591,510
[45] Date of Patent: May 27, 1986

[54] RUSTY BOLT INTERMODULATION INTERFERENCE REDUCER

[75] Inventors: Ramanathan Panayappan, Potomac, Md.; John C. Cooper, Burke, Va.

[73] Assignee: The United States of America as represented by the Secretary of the Navy, Washington, D.C.

[21] Appl. No.: 722,579

[22] Filed: Apr. 12, 1985

[51] Int. Cl.$^4$ .............................................. B05D 5/12
[52] U.S. Cl. ...................................... 427/125; 427/58; 427/123; 427/126.1; 427/383.1; 427/388.1; 252/82; 252/518; 252/519; 156/60; 156/331.6
[58] Field of Search ................. 427/58, 126.1; 252/82; 252/518, 519; 427/123, 125, 383.1, 388.1; 156/60, 331.6

[56] References Cited

U.S. PATENT DOCUMENTS 4,424,079  1/1984  Barabas ................................... 134/4
4,451,296  5/1984  Barabas ................................... 134/4

OTHER PUBLICATIONS

Cooper, et al., "Clinically Suppressing Rusty Bolt Intermodulation Interference", printed in EMC Technology & Interference Control News, vol. 4, No. 1, p. 63, (1985).

Cooper et al., "Chemically Suppressing Rusty-Bolt Intermodulation Interference", Proc. IEEE National Symposium on EMC, Apr. 1984, pp. 233–240.

*Primary Examiner*—Richard Bueker
*Attorney, Agent, or Firm*—Robert F. Beers; William T. Ellis; Wendell R. Guffey

[57] ABSTRACT

A chemical composition formed from a chelating agent, polymeryable bonding agent, and a high dielectric solvent which eliminates intermodulation interference when applied to "rusty bolt" junctions.

12 Claims, No Drawings

RUSTY BOLT INTERMODULATION INTERFERENCE REDUCER

BACKGROUND OF THE INVENTION

Intermodulation interference (IMI) occurs when high frequency (HF) transmitters and receivers are placed in close proximity, particularly on ships and aircraft, due to non-linear conduction through metal-oxide-metal (MOM) junctions in the supporting structure. This is also known as "rusty bolt" intermodulation interference. IMI is a problem where there are any non-welded metal-to-metal joints but pose particular problems on ships due to MOM junctions in or at life lines, ladders, flag poles, bond straps, boat davits, stays, nets, chains, etc. Steel, aluminum, brass and copper are examples of common metals that form MOM Junctions but any metal that can form an oxide can form a MOM junction. MOM junctions interfere with signal transmission throughout the HF to infrared range, but pose particular problems for communications in the 2-30 MHz region and for VHF frequencies.

The electrical behavior of the MOM junction responsible for the IMI is similar to that of two parallel back-to-back semiconductor diodes, each operating in its forward conducting region. The non-linear conduction of the MOM junction or the analagous diode configuration is the mixing mechanism that generates IMI. This mixing action, and thus the IMI, can be suppressed if the current through the MOM junction is by-passed through a linear conductive path, i.e., one with low resistance or low reactance.

Eliminating or reducing IMI by providing a linear conductive path has traditionally been accomplished by clamping or welding conductive ground straps across the MOM junction thus shorting-out the MOM junction or by replacing the MOM junction with non-conductive material thus eleminating the MOM junction. These solutions, although effective, have limitations. Using non-conductive materials is prohibitive where structural strength or electrical conductivity is required. Welding or clamping straps cannot be used where there is a multiplicity of MOM junctions, such as in chains or twisted cable, or where dissimilar metals are involved. Additionally, the use of non-conductive materials or conductive straps is very expensive. To overcome these limitations while effectively reducing IMI, an inexpensive method that maintains the structural integrity of supporting hardware while providing a highly conductive current path is required.

Previous methods used to overcome IMI relied upon "rust removal compositions" which have incorporated the general principles of chelating the ferric ion, incorporating the ion into a polymer material, and removing the "rust" with the polymer material. Barabas, U.S. Pat. No. 4,424,079, used a vinylpyrrolidone/maleic acid copolymer to remove rust by this general technique. Panayappan, in U.S. Pat. No. 4,325,744, used a vinylpyrrolidone/ethylenediaminetetraacetic acid (EDTA) or similar chelating agent to encapsulate rust which can be peeled from the surface and disposed of as a solid waste. Neither of these references, however, contemplate changing the oxidation state of the metal to increase conductivity nor consider the application of the composition to nonferric oxides nor did they consider incorporation of a chemical reducing agent that would prevent further corrosion and IMI generation. Thus, the usefulness of the techniques is limited to "rust removal" processes involving ferric ions. The references do not consider increasing structural intergrity or providing more conductive paths necessary to reduce IMI, applications to other metals, or inhibition of further corrosion.

A method is, therefore, needed which can eliminate IMI by providing a low resistance and low reactance linear conductive current path through potential MOM junctions.

SUMMARY

It is, therefore, an object of this invention to provide a method which can reduce IMI.

It is another object of this invention to provide a method which reduces IMI by providing a low resistance and low reactance linear conductive path at potential MOM junctions.

It is another object of this invention to provide a method which eliminates IMI by converting MOM junctions to linear conductive current paths.

It is a further object of this invention to provide a method which protects the metal surface from corrosion thus eliminating further oxidation which causes MOM junctions.

These and other objects are accomplished using a Chemical Bonding Agent (CBA) which comprises a metal ion-amine-halogen chelating agent, a high dielectric constant solvent or additive, and a polymerizable bonding agent. The resulting composition forms a CBA which can penetrate the MOM junction and remove the metal oxide, provide a low resistance-low reactance current path, form a structurally hard compound which remains between the metal surfaces, and inhibit further corrosion on the metal surfaces.

Other objects, advantages, and novel features of the present invention will become apparent from the following detailed description of the invention.

DESCRIPTION

The CBA of the present invention comprises a mixture of a metal ion-amine-halogen chelating agent, a high dielectric constant solvent, and a polymerizable bonding agent. The metal ion in the chelating agent is a multivalent transition metal selected from the group consisting of vanadium, chromium, manganese, iron, cobalt, nickel, copper, zinc, silver, and cadmium; copper and iron are preferred with copper being most preferred. Other group 4, 5, and 6 Transition elements, such as gold, platinum and ruthenium, should function in the present invention but due to their rarity and expense have not been tested. The amine in the chelating agent can be virtually any amine although primary amines, because of their tendency to cause corrosion, should be avoided. Heterocyclic amines, such as pyrrole, pyrrolidine, pyridine, pyrazine and substituted derivatives of these, work particularly well in the present invention, with pyrrolidine being preferred. The halogen in the chelating agent is selected preferrably from the group consisting of chlorine, bromine and iodine, with chlorine being most preferred. The most preferred chelating agent is copper-pyrrolidine-chloride having the formula $Cu(pyrrolidine)Cl_2$.

The solvent in the present invention should be any high dielectric solvent. Polyol solvents such as propylene gylcol, ethylene glycol, or 1, 3 propane-diol are preferred solvents, with ethylene glycol being most preferred. Other high dielectric constant solvents such as formamide also function in the present invention.

The polymerizable bonding agent can be any linear polymer with coordinating functional groups. For example, polyacrylamide, polyacrylic acid, and polyvinyl pyrrolidinone function equally well in the present invention, with poly-vinyl pyrrolidinone being preferred.

The mixture forming the CBA should consist of between about 40-90 percent by weight of the a high dielectric constant solvent; between about 10-60 percent by weight of the chelating agent, preferably between 15-30 percent by weight; and between about 2-30 percent by weight of a polymerizable binding agent, preferably between 5-20 percent by weight.

In the preferred embodiment of the invention about 20 percent by weight of copper-pyrrolidine-chloride, about 5 percent by weight of polyvinyl pyrrolidinone, and about 75 percent by weight of ethylene gylcol are mixed to form a visious green solution which can be applied to metal surfaces by any common means, preferably painting or spraying. The chelating functional groups in PVP and pyrrolidine incorporate the metal of the metal oxide into their structure thus removing the metal oxide from the MOM junction.

The homogeneous solution produced by mixing the components has a high dielectric constant. The copper complex, ethylene glycol, and resulting metal-PVP complex all contribute to effect the high dielectric constant of the material. The high dielectric constant creates a low reactance current path through the junction thus limiting current flow through any remaining or subsquently formed MOM junctions. Unlike hetergeneous solutions, the homogenous solution has a net dielectric constant which is a linear combination of the components and thus achieves a high dielectric constant in a material containing some low-dielectric constant components.

The PVP is cross-linked by metal ions removed from the metal oxide thus producing a structurally strong, hard material that sets in place and remains there to provide structural integrity at the junction. The PVP is also a mild reducing agent which prevents future oxidative or electrolytic corrosion.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE I

A "rusty bolt" or MOM junction was created by placing together two crossed pieces of ⅛ inch square metal stock held in a vise with an adjusting resolution of better than two micrometers. The rf test system consisted of two rf signals at 2.00 MHz and 2.828 MHz applied to the junction, a Spectrum Analyzer acting as a receiver, and a curve tracer to confirm non-linearity of the junction. Notch filters were used to suppress the fundamentals. The two-tone test generator was capable of delivering +25 dBm to the junction. By adjusting the screw in the vise, MOM junctions are created by bringing the metal oxide and oxide metal interface sufficiently close together that electron tunneling occurs (estimated to be 50-100Å).

A composition suitable for use in practicing the invention was prepared by the following procedure: 5.05 grams of copper pyrrolidine chloride was dissolved in 18.8 grams of ethylene glycol and then 1.3 grams of polyvynilpyrrolidinone (GAF PVP-K-90) was added to the resulting solution. This green product was added dropwise to the above mentioned MOM junction. After addition, the IE curve immediately became linear and the measurements from the spectrum analyser slowed a substantial reduction in IMI at all orders (more than 30 dB at 3rd and 5th orders).

EXAMPLE II

A similar CBA was tested on a steel superstructure ship. The test was performed directly underneath the transmitting antennas. The standard NAVSEA SEM-CIP (Shipboard Electromagnetic Compatability Improvement Program) IMI survey techniques were used for measuring IMI. Two transmitters (2.24 MHz and 4.94 MHz) were coupled to the same antenna through a multicoupler and the ships receivers and an NM25T portable receiver were used to identify and locate junctions and to measure reduction in IMI. The CBA used was prepared by mixing 40.3 grams of copper-pyrrolidine-chloride, 9.9 grams of polyvinylpyrrolidinone, and 150.8 grams of ethylene glycol. The mixture was sprayed on the rusty bolts and the IMI measured before and after application. IMI at the 5th order was suppressed by 27 dB.

EXAMPLE III

Another sample of this CBA was prepared by mixing 19.8 grams of copper pyrrolidine chloride, 5.1 grams of polyvinyl pyrrolidinone, and 75.2 grams of ethylene glycol. This CBA was sprayed on a steel-aluminum MOM Junction found in a ladder on a ship. The extent of IMI reduction was monitored with a tektronix-492 portable spectrum analyzer the reduction was 21 db at the 5th order.

EXAMPLE IV

When the above CBA was applied to a copper-steel rusty bolt with a tin flashing found around a braided cable, the reduction was about 22 db at the 5th order.

The above two examples indicate the effect after CBA to be much better in steel MOM junction than other metal MOM junctions.

EXAMPLE V

Another sample of this CBA prepared by mixing 15.3 grams of copper-pyrrolidine-chloride, 15.5 grams of polyvinyl pyrrolidinone and 50.8 grams of ethylene glycol was sprayed on a steel MOM junction found on a rusty bolt in a boat stay. The reduction at the 5th order was 12 db.

This CBA is particularly useful as a conductive bridge between metal junctions used around communication transmission stations. These junctions typically have metal oxide coatings which interfere with the transmission of electronic signals. The present invention removes the metal oxide and provides a linear current path which does not interfere with signal transmission. The CBA could, however, have other uses such as a general purpose metal oxide remover or as a conductive paint for numerous electronic applications.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for reducing Intermodulation Interference which comprises the steps of:
   contacting a metal-oxide-metal junction with a Chemical Bonding Agent composition comprising between about 10 and 60 percent by weight of a transition metal ion-amine-halogen chelating agent, between about 2 and 30 percent by weight of a polymerizable bonding agent, and between about 40 and 90 percent by weight of a high dielectric solvent;
   allowing said composition to penetrate the metal-oxide-metal junction by chelating the metal ions in said metal-oxide-metal junction with said chelating agent;
   allowing said composition to reduce said metal ions in said metal-oxide-metal junction to zero-valent metal thereby producing a conductive mixture; and
   allowing said composition to inhibit future metal-oxide-metal junctions by cross-linking said polymerizable amine bonding agent thus forming a hardened material which remains in place to form a linear conductive path between the metal-metal junction.

2. The method of claim 1, wherein said metal ion in said transition metal ion-amine-halogen chelating agent in said contacting step is a multi-valent transition metal selected from the group consisting of vanadium, chromium, manganese, iron, cobalt, nickel, copper, zinc, silver, and cadmium.

3. The composition of claim 2, wherein said amine in said transition metal ion-amine-halogen chelating agent in said contacting step is selected from the group consisting of pyrrole, pyrrolidine, pyridine, pyrazine and substituted derivatives thereof.

4. The composition of claim 3, wherein said metal ion-amine-halogen chelating agent in said contacting step is a copper-pyrrolidine-chloride complex having the formula $Cu(pyrrolidine)Cl_2$.

5. The composition of claim 4, wherein said polymerizable bonding agent in said contacting step is selected from a group consisting of pyrrole, pyrrolidine, pyridine, pyrazine and substituted derivatives thereof.

6. The method of claim 5, wherein said polymerizable bonding agent is polyvinyl pyrrolidinone.

7. The method of claim 6, wherein said high dielectric solvent in said contacting step is a polyol solvent.

8. The method of claim 7, wherein said polyol solvent is selected from a group consisting of ethylene glycol, propylene glycol, and 1,3-propane-diol.

9. The method of claim 8, wherein said solvent is ethylene glycol.

10. The method of claim 9, wherein said composition in said contacting step comprises about 20 percent by weight copper-pyrrolidine-chloride, about 5 percent by weight polyvinyl pyrrolidione, about 75 percent by weight ethylene glycol.

11. A method for reducing Intermodulation Interference which comprises the steps of:
    contacting a metal-oxide-metal junction with a Chemical Bonding Agent composition comprising between about 10 and 60 percent by weight of a copper-pyrrolidine-chloride complex having the formula $Cu(pyrrolidine)Cl_2$, between about 2 and 30 percent by weight of polyvinyl pyrrolidinone, and between about 40 and 90 percent by weight of ethylene glycol;
    allowing said composition to penetrate the metal-oxide-metal junction by chelating the metal ions in said metal-oxide-metal junction with said chelating agent;
    allowing said composition to reduce said metal ions in said metal-oxide-metal junction to zero-valent metal thereby producing a conductive mixture; and
    allowing said composition to inhibit future metal-oxide-metal junctions by cross-linking said polymerizable amine bonding agent thus forming a hardened material which remains in place to form a linear conductive path between the metal-metal junction.

12. The method of claim 11, wherein said composition in said contacting step comprises about 20 percent by weight copper-pyrrolidine-chloride, about 5 percent by weight polyvinyl pyrrolidione, about 75 percent by weight ethylene glycol.

* * * * *